US012615080B2

(12) United States Patent
Oh et al.

(10) Patent No.: US 12,615,080 B2
(45) Date of Patent: Apr. 28, 2026

(54) APPARATUS AND METHODS FOR CANCELING INTERFERENCE FOR 5G ICS REPEATER

(71) Applicant: K-NETZ CO., LTD., Seoul (KR)

(72) Inventors: Kyung Hoon Oh, Seoul (KR); Hee Gu Ahn, Seongnam-si (KR); Yong Seok Oh, Seoul (KR); Sun Ho Kim, Incheon (KR); Jun Ho Kang, Seoul (KR)

(73) Assignee: K-NETZ CO., LTD., Seoul (KR)

( * ) Notice: Subject to any disclaimer, the term of this patent is extended or adjusted under 35 U.S.C. 154(b) by 342 days.

(21) Appl. No.: 18/417,315

(22) Filed: Jan. 19, 2024

(65) Prior Publication Data

US 2024/0250748 A1      Jul. 25, 2024

(30) Foreign Application Priority Data

Jan. 20, 2023    (KR) ........................ 10-2023-0008709
Jan. 8, 2024    (KR) ........................ 10-2024-0003107

(51) Int. Cl.
　　 *H04B 7/155*　　　(2006.01)
　　 *H04B 17/40*　　　(2015.01)
(52) U.S. Cl.
　　 CPC ......... *H04B 7/15585* (2013.01); *H04B 17/40* (2015.01)
(58) Field of Classification Search
　　 CPC ........................... H04B 7/15585; H04B 17/40
　　 See application file for complete search history.

(56) References Cited

U.S. PATENT DOCUMENTS

2010/0109771 A1* 5/2010 Baik ................. H04B 7/15585
                                                                      330/149
2011/0256857 A1* 10/2011 Chen ..................... H01Q 1/521
                                                                      455/7
(Continued)

FOREIGN PATENT DOCUMENTS

JP          2008-252642 A      10/2008
JP          2016-524857 A       8/2016
(Continued)

OTHER PUBLICATIONS

Aso Tetsuo, "Office Action for Japanese Application No. 2024-006616", Jan. 14, 2025, JPO, Japan.
(Continued)

*Primary Examiner* — Angelica Perez
(74) *Attorney, Agent, or Firm* — Bridgeway IP Law Group, PLLC; Jihun Kim

(57) ABSTRACT

An ICS repeater usable in a wireless network and, more specifically, a method for effectively canceling only an interference signal by selectively using an autocorrelation canceller in an ICS repeater are described. According to one aspect, a method for canceling interference performed by a 5G ICS repeater may comprise obtaining a first error signal by removing a first predicted feedback signal from a first original signal received through a reception antenna; generating a first delay signal by delaying the first error signal; determining whether the first original signal is a null signal based on magnitude information of the first error signal; determining a first reference signal based on the first delay signal according to a determination result of whether the first original signal is a null signal; and generating a second predicted feedback signal based on the first reference signal.

16 Claims, 4 Drawing Sheets

(56)     References Cited

U.S. PATENT DOCUMENTS

2016/0173187  A1      6/2016  Oh et al.
2017/0187449  A1*    6/2017  Kwon ................ H04B 7/15585

FOREIGN PATENT DOCUMENTS

KR      10-2004-0097558  A      11/2004
KR      10-2013-0054305  A        5/2013
KR          20130054305  A   *    5/2013    ......... H04B 7/15585
KR          10-1429705  B1       8/2014
KR          102203955  B1  *   1/2021    ......... H04B 7/15585

OTHER PUBLICATIONS

Examiner, "Office Action for Korean Application No. 10-2024-0003107", Jun. 24, 2025, KIPO, Republic of Korea.

* cited by examiner

APPARATUS AND METHODS FOR CANCELING INTERFERENCE FOR 5G ICS REPEATER

CROSS-REFERENCE TO RELATED APPLICATION

This application is based on and claims priority from Korean Patent Application No. 10-2023-0008709, filed on Jan. 20, 2023, and Korean Patent Application No. 10-2024-0003107, filed on Jan. 8, 2024, the disclosure of which is incorporated herein in its entirety by reference for all purposes.

TECHNICAL FIELD

The present disclosure relates to an ICS repeater usable in a wireless network and, more specifically, to a method for effectively canceling only an interference signal by selectively using an autocorrelation canceller in an ICS repeater.

BACKGROUND

In general, an ICS repeater is a system to solve the oscillation problem caused by the feedback signal that occurs between transmission and reception antennas in a wireless repeater; more specifically, the ICS repeater is a wireless repeater that employs a method that predicts a feedback signal by applying an interference cancellation technique to an existing wireless repeater and removes the feedback signal by subtracting the predicted feedback signal from the original input signal.

The interference cancellation engine unit in an adaptive ICS repeater, which employs an interference cancellation method with a general adaptive algorithm, is located between a transmission antenna and a reception antenna and comprises a delay unit, a coefficient generator, and an FIR filter. A subtractor generates an error signal e(n) by eliminating an interference signal from the original signal (d(n)=s(n)+y(n)) received through the reception antenna. At this time, the coefficient generator of the interference cancellation engine unit generates interference signal prediction coefficients w(n) by computing the correlation between the error signal e(n) obtained by eliminating an interference signal through the subtractor and a reference signal x(n) delayed by a predetermined amount of time through the delay unit. The interference signal prediction coefficient w(n) is convolved with the reference signal x(n) through the FIR filter to generate an in-phase predicted feedback signal y'(n); the predicted feedback signal y'(n) is subtracted from the original signal through the subtractor 21, and a signal from which an interference signal has been removed is output to the transmission antenna 30.

Adaptive ICS repeaters that employ the interference cancellation method based on the adaptive algorithm generally apply the Least Mean Square (LMS) or Recursive Least Square (RLS) adaptive algorithm; since the adaptive algorithm predicts a feedback signal and generates an in-phase feedback signal using the correlation between an error signal e(n) and a reference signal x(n), the interference cancellation capability of adaptive ICS repeaters varies according to the characteristics of an input signal source.

In particular, when a narrowband signal compliant with the subcarrier part of the 5G, LTE, or OFDM specification or a narrowband signal compliant with the NB-IOT specification is input, an interface signal is not effectively removed due to the autocorrelation characteristics of the input signal; instead, an undesired noise signal is generated.

To solve the problem above, the Korean patent publication No. 10-2013-0054305 (Interference Cancellation Method of Interference Cancellation System Repeater) discloses an interference cancellation method for an ICS repeater using an autocorrelation canceller.

Also, another ICS repeater using an autocorrelation canceller according to the prior art employs a method that removes a narrowband signal from a feedback signal, retains only the broadband white noise component, and uses the white noise component as a reference signal x(n); the aforementioned method is able to predict and remove the feedback signal without being influenced by the correlation characteristics of the narrowband signal; however, since the reference signal x(n) is obtained by removing the narrowband signal and preserving only the white noise, the signal level weakens, which eventually leads to a problem in that the adaptation rate for calculating prediction coefficients w(n) is slowed down.

To overcome the problem above, weak signals are amplified; in this case, when a null signal (white noise) is input, a noise signal gets amplified to generate a new reference signal x'(n), and the distortion in the SNR of a repeater output signal unnecessarily increases the noise level at the receiving side of a base station, thereby reduces the capacity of the base station.

Also, another method according to the prior art discloses an ICS repeater and an interference cancellation method using a selective normalizer in the Korean patent No. 10-2203955 (Method for Interference Cancellation of ICS Repeater using Selective Normalization).

Based on the structure of an apparatus for canceling interference for an ICS repeater using a selective normalizer according to the prior art may obtain a normalized new reference signal x'(n) by transforming data in the time domain to data in the frequency domain using a normalizer, normalizing the magnitude of the transformed data, and transforming the normalized data back to the corresponding data in the time domain.

The aforementioned method is able to predict and remove a feedback signal without being influenced by the correlation characteristics of a narrowband signal; however, in a broadband wireless network such as 5G, a delay occurs, which is five times larger than the delay observed in the LTE network, during the process of transforming time-domain data of an input signal to the corresponding frequency-domain data, normalizing the magnitude of the transformed data, and transforming the normalized data back to the corresponding data in the time domain. Such a delay hinders the design of an ICS repeater suitable for the 5G network.

SUMMARY

In view of the above, instead of always employing an autocorrelation canceller to remove an undesired noise signal generated by a narrowband signal, the present disclosure provides an interference cancellation method capable of effectively removing both a narrowband signal and an interference signal even when a null signal (white noise) is input by selectively using the autocorrelation canceller.

Also, the present disclosure provides an interference cancellation method for an ICS repeater, which satisfies the delay requirements adopted even in a broadband wireless network such as 5G.

According to one aspect of the present disclosure, a method for canceling interference performed by a 5G ICS repeater may comprise obtaining a first error signal by removing a first predicted feedback signal from a first original signal received through a reception antenna; generating a first delay signal by delaying the first error signal; determining whether the first original signal is a null signal based on magnitude information of the first error signal; determining a first reference signal based on the first delay signal according to a determination result of whether the first original signal is a null signal; and generating a second predicted feedback signal based on the first reference signal.

In one embodiment, a method for canceling interference for a 5G ICS repeater may further comprise generating a second error signal by removing the second predicted feedback signal from a second original signal received through the reception antenna.

In one embodiment, if the first original signal is determined as a null signal, the determining of the first reference signal may select the first delay signal as the first reference signal.

In one embodiment, if the first original signal is determined as a non-null signal, the determining of the first reference signal may generate a first narrowband cancellation signal by removing characteristics of a narrowband signal from the first delay signal and select the first narrowband cancellation signal as the first reference signal.

In one embodiment, the determining of whether the first original signal is a null signal may include obtaining magnitude information through envelope detection of the first error signal or the first delay signal; and determining the first original signal as a null signal if the magnitude information is less than a predetermined reference magnitude or determining the first original signal as a non-null signal if the magnitude information is greater than or equal to the predetermined reference magnitude.

In one embodiment, the predetermined reference magnitude may be set based on a measurement result of the first original signal when a null signal is input to the 5G ICS repeater.

In one embodiment, the generating of the second predicted feedback signal may include calculating a first interference signal prediction coefficient based on correlation between the first error signal and the first reference signal; and generating the second predicted feedback signal by performing a convolution operation between the first delay signal and the first interference signal prediction coefficient.

According to another aspect of the present disclosure, a method for canceling interference performed by a 5G ICS repeater may comprise obtaining a first error signal by removing a first predicted feedback signal from a first original signal received through a reception antenna; generating a first delay signal by delaying the first error signal; generating a first narrowband cancellation signal by removing characteristics of a narrowband signal from the first delay signal; determining whether the first original signal is a null signal based on magnitude information of the first error signal; determining either of the first delay signal and the first narrowband cancellation signal as a first reference signal according to a determination result of whether the first original signal is a null signal; and generating a second predicted feedback signal based on the first reference signal.

According to yet another aspect of the present disclosure, an apparatus for canceling interference for a 5G ICS repeater may comprise a time delay unit generating a first delay signal by delaying a first error signal obtained by removing a first predicted feedback signal from a first original signal received through a reception antenna; a reference signal determination unit determining whether the first original signal is a null signal based on magnitude information of the first error signal and determining a first reference signal based on the first delay signal according to a determination result of whether the first original signal is a null signal; and a predicted feedback signal generation unit generating a second predicted feedback signal based on the first reference signal.

According to still another aspect of the present disclosure, an apparatus for canceling interference for a 5G ICS repeater may comprise a time delay unit generating a first delay signal by delaying a first error signal obtained by removing a first predicted feedback signal from a first original signal received from a reception antenna; an autocorrelation canceller generating a first narrowband cancellation signal by removing characteristics of a narrowband signal from the first delay signal; a reference signal selection unit determining whether the first original signal is a null signal based on magnitude information of the first error signal and selecting either of the first delay signal and the first narrowband cancellation signal as a first reference signal based on a determination result of whether the first original signal is a null signal; and a predicted feedback signal generation unit generating a second predicted feedback signal based on the first reference signal.

Advantageous Effects

According to one aspect of the present disclosure, instead of always employing an autocorrelation canceller to remove an undesired noise signal generated due to a narrowband signal, a selective use of the autocorrelation canceller allows for effective removal of both the narrowband signal and an inference signal even when a null signal (white noise) is input.

Also, according to another aspect of the present disclosure, interference cancellation for an ICS repeater is possible, which satisfies the delay requirements adopted even in a broadband wireless network such as 5G.

DETAILED DESCRIPTION

The advantages and features of the present disclosure, and a method for achieving them will be clearly understood with reference to the embodiments described in detail together with appended drawings. However, the technical principles and spirit of the present disclosure are not limited to the embodiments disclosed below but may be implemented in various other forms; rather, the present embodiments are provided to make the present disclosure complete and inform those skilled in the art clearly of the technical scope of the present disclosure, and the technical principles and spirit of the present disclosure may be defined within the technical scope of the appended claims.

In describing embodiment of the present disclosure, detailed descriptions of well-known functions or structures will be omitted unless they are deemed essential to describe the embodiments of the present disclosure. In addition, terms presented below have been defined considering the functions according to an embodiment of the present disclosure, which may vary depending on the intentions of a user or an operator or industry practices. Therefore, specific definitions should be given based on the description provided throughout the present disclosure.

The term "unit" or "module" used in the document refers to a base unit for processing at least one function or operation, which may be implemented by hardware or software or a combination of both.

Figure 1:
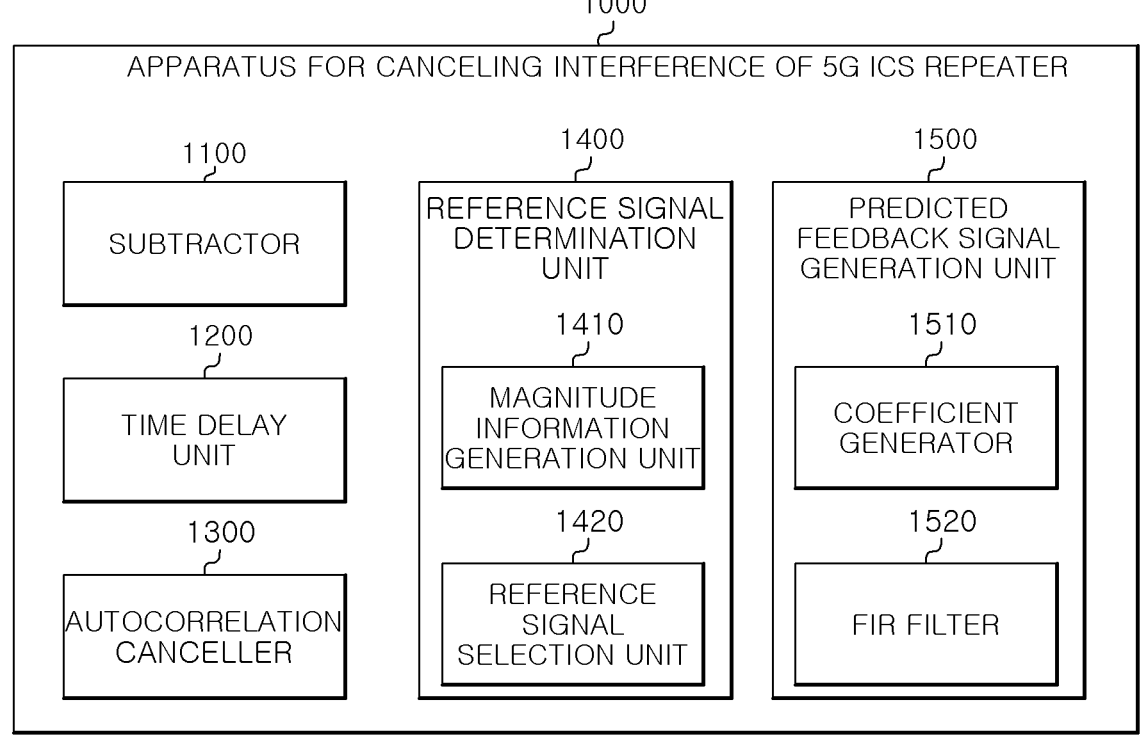
FIG. 1 shows a block diagram of an apparatus for canceling interference for a 5G ICS repeater according to one embodiment of the present disclosure.

FIG. 1 shows a block diagram of an apparatus for canceling interference for a 5G ICS repeater according to one embodiment of the present disclosure.

Referring to FIG. 1, an apparatus for canceling interference 1000 for a 5G ICS repeater according to one embodiment of the present disclosure may comprise a subtractor 1100, a time delay unit 1200, an autocorrelation canceller 1300, a reference signal determination unit 1400, and a predicted feedback signal generation unit 1500.

The subtractor 1100 may generate an error signal by removing an interference signal (predicted feedback signal) from an original signal received using a reception antenna 4100 of the 5G ICS repeater.

In one embodiment, the original signal may include a signal transmitted by a transmitter of a base station and a feedback signal, which is a signal transmitted from a transmission antenna of the 5G ICS repeater and received again by the reception antenna 4100 of the 5G ICS repeater.

The time delay unit 1200 may generate a delay signal by delaying the error signal.

In one embodiment, the time delay unit 1200 may delay the error signal by a predetermined amount of time.

In one embodiment, the predetermined amount of time may be set differently by the specification of the 5G ICS repeater, an intended use (frequency of a target repeater signal), a delay, or a user.

The autocorrelation canceller 1300 may generate a narrowband cancellation signal by removing characteristics of a narrowband signal from a delayed signal.

In one embodiment, the autocorrelation canceller 1300 may generate the narrowband cancellation signal if the original signal is determined as a non-null signal.

The reference signal determination unit 1400 may determine whether the original signal is a null signal based on magnitude information of the error signal and determine a reference signal based on a delay signal according to the determination result; to this end, the reference signal determination unit 1400 may include magnitude information generation unit 1410 and a reference signal selection unit 1420.

The magnitude information generation unit 1410 may obtain magnitude information through envelope detection of the error signal or delay signal.

In one embodiment, the magnitude information may include the magnitude of the original signal.

In one embodiment, the magnitude information generation unit 1410 may perform envelope detection by converting the error signal or the delay signal to a positive-valued signal (absolute value) and passing the positive-valued signal through a low-pass filter.

The reference signal selection unit 1420 may determine whether the original signal is a null signal based on the magnitude signal and select either of the error signal and the delay signal as a reference signal according to the determination result.

In one embodiment, the reference signal selection unit 1420 may determine that the original signal is a null signal if the magnitude information is less than a predetermined reference magnitude.

In one embodiment, the reference signal selection unit 1420 may determine that the original signal is a non-null signal if the magnitude information is greater than or equal to the predetermined reference magnitude.

In one embodiment, the predetermined reference magnitude may be set based on a measurement result of the original signal when a null signal is input to the 5G ICS repeater. Here, the predetermined reference magnitude is used to distinguish between a non-null signal and a null signal and may be set differently for each ICS repeater; the magnitude for determining whether a signal under consideration is a null signal may be set based on a measurement result of the magnitude when a null signal is input. In a typical situation, a repeater processes a digital signal by converting an RF signal to an IF signal and converting the IF signal back to sampling data using ADC. At this time, since each ICS repeater may use a different gain for converting the RF signal to the IF signal, the predetermined reference magnitude may be set differently for each ICS repeater. In other words, if a large gain is used to convert the RF signal to the IF signal, the predetermined reference magnitude may also be set to a large value.

In one embodiment, if the original signal is determined as a null signal, the reference signal selection unit 1420 may select the delay signal as a reference signal.

In one embodiment, if the original signal is determined as a non-null signal, the reference signal selection unit 1420 may generate a narrowband cancellation signal by removing characteristics of a narrowband signal from the delay signal and select the narrowband cancellation signal as a reference signal.

The predicted feedback signal generation unit 1500 may generate a predicted feedback signal based on the reference signal and, to this purpose, may include a coefficient generator 1510 and an FIR filter 1520.

The coefficient generator 1510 may calculate interference signal prediction coefficients based on the correlation between the error signal and the reference signal.

The FIR filter 1520 may generate a new predicted feedback signal by performing a convolution operation between the delay signal and the interference signal prediction coefficients.

Also, since the present disclosure selectively applies an autocorrelation canceller to address the problem found in the prior art, it is evident that methods disclosed in the prior art, including specific methods for autocorrelation cancellation, may also be applied to the present disclosure.

Figure 2:
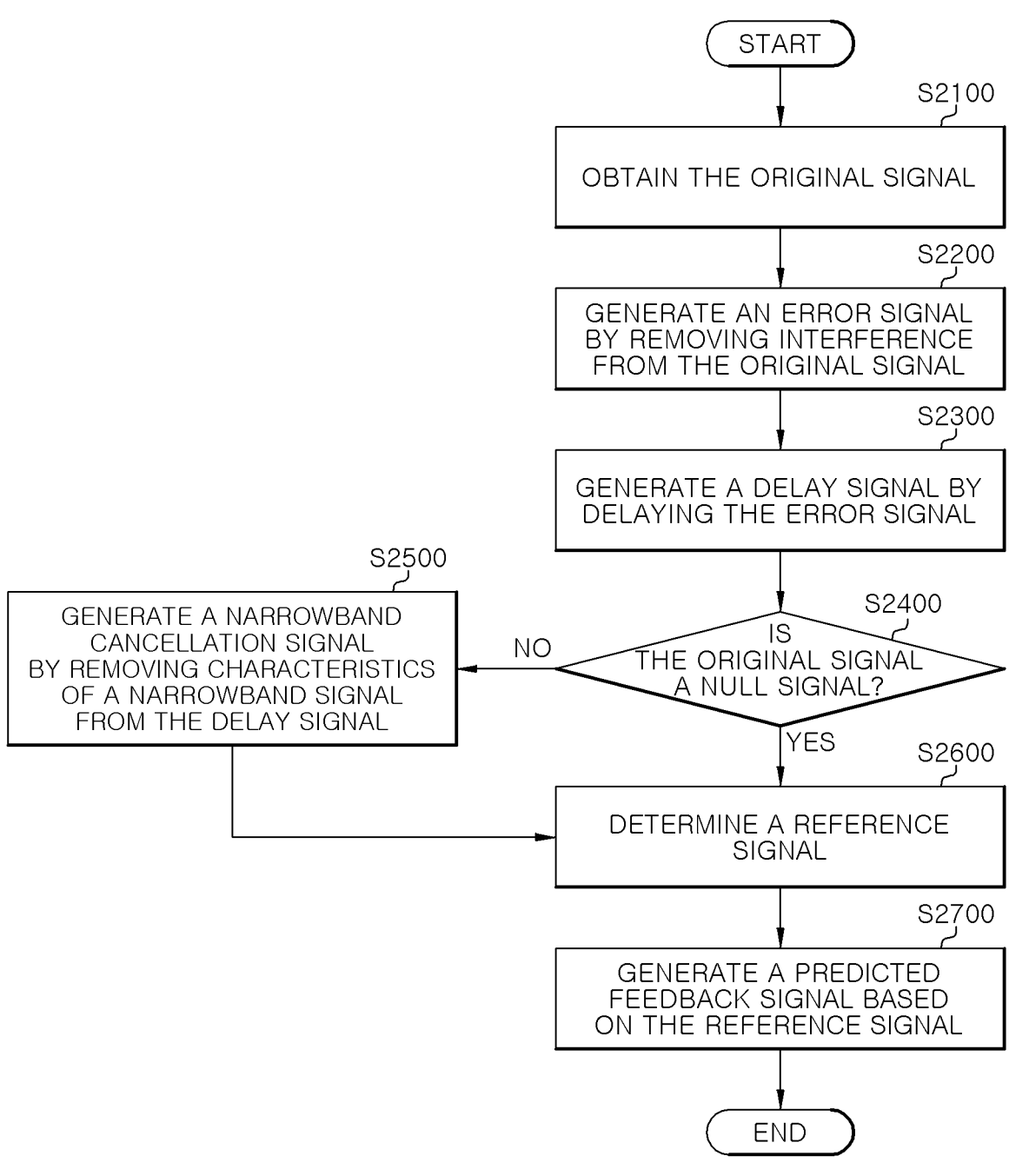
FIG. 2 is a flow diagram of a method for canceling interference for a 5G ICS repeater according to one embodiment of the present disclosure.

FIG. 2 is a flow diagram of a method for canceling interference for a 5G ICS repeater according to one embodiment of the present disclosure.

In what follows, it is assumed that the method is performed by the apparatus for canceling interference 1000 of the 5G ICS repeater shown in FIG. 1.

In the S2100 step, the apparatus for canceling interference 1000 of the 5G ICS repeater obtains a first original signal. Specifically, the apparatus for canceling interference 1000 of the 5G ICS repeater may obtain the first original signal using a reception antenna 4100 of the 5G ICS repeater.

In one embodiment, the original signal may include a signal transmitted by a transmitter of a base station and a feedback signal, which is a signal transmitted from a transmission antenna of the 5G ICS repeater and received again by the reception antenna 4100 of the 5G ICS repeater.

In the S2200 step, the apparatus for canceling interference 1000 of the 5G ICS repeater may obtain a first error signal from which an interference signal has been removed, by removing a first predicted feedback signal from the first original signal.

In the S2300 step, the apparatus for canceling interference 1000 of the 5G ICS repeater may generate a first delay signal obtained by delaying the first error signal.

In one embodiment, the apparatus for canceling interference 1000 of the 5G ICS repeater may generate a delay signal by delaying an error signal by a predetermined amount of time.

In one embodiment, the predetermined amount of time may be set differently by the specification of the 5G ICS repeater, an intended use (frequency of a target repeater signal), a delay, or a user.

In the S2400 step, based on the magnitude information of the first error signal, the apparatus for canceling interference 1000 of the 5G ICS repeater may determine whether the first original signal is a null signal.

In one embodiment, the apparatus for canceling interference 1000 of the 5G ICS repeater may obtain magnitude information of the first error signal and determine whether the first original signal is a null signal based on the magnitude information of the first error signal obtained.

In one embodiment, the magnitude information may include the magnitude of the error signal.

In one embodiment, the apparatus for canceling interference 1000 of the 5G ICS repeater may obtain magnitude information of the error signal through envelope detection of the error signal or delay signal.

In one embodiment, if the magnitude of the error signal is less than a predetermined reference magnitude, the apparatus for canceling interference 1000 of the 5G ICS repeater may determine that the original signal is a null signal.

In one embodiment, if the magnitude of the error signal is greater than the predetermined reference magnitude, the apparatus for canceling interference 1000 of the 5G ICS repeater may determine that the original signal is a non-null signal.

In the S2500 step, if the first original signal is determined as a non-null signal, the apparatus for canceling interference 1000 of the 5G ICS repeater may generate a first narrowband cancellation signal by removing characteristics of a narrow-band signal from the first delay signal.

In the S2600 step, based on the determination result of whether the first original signal is a null signal, the apparatus for canceling interference 1000 of the 5G ICS repeater may determine a first reference signal.

In one embodiment, if the original signal is determined as a null signal, the apparatus for canceling interference 1000 of the 5G ICS repeater may select a delay signal as a reference signal. In one embodiment, if the original signal is determined as a non-null signal, the apparatus for canceling interference 1000 of the 5G ICS repeater may select a narrowband cancellation signal as a reference signal.

In the S2700 step, the apparatus for canceling interference 1000 of the 5G ICS repeater may generate a second predicted feedback signal based on the first reference signal.

In one embodiment, the apparatus for canceling interference 1000 of the 5G ICS repeater may calculate a first interference signal prediction coefficient based on correlation between the first error signal and the first reference signal and generate a new predicted feedback signal (the second predicted feedback signal) by performing a convolution operation between the first delay signal and the first interference signal prediction coefficient.

Afterwards, the apparatus for canceling interference 1000 of the 5G ICS repeater may repeat the S2100 to S2700 steps, including generation of a second error signal by removing the second predicted feedback signal from a second original signal received after the first original signal.

Also, in the flow diagram of FIG. 2, the S2400 and S2300 steps may be performed simultaneously, or one of the steps may precede the other.

Figure 3:
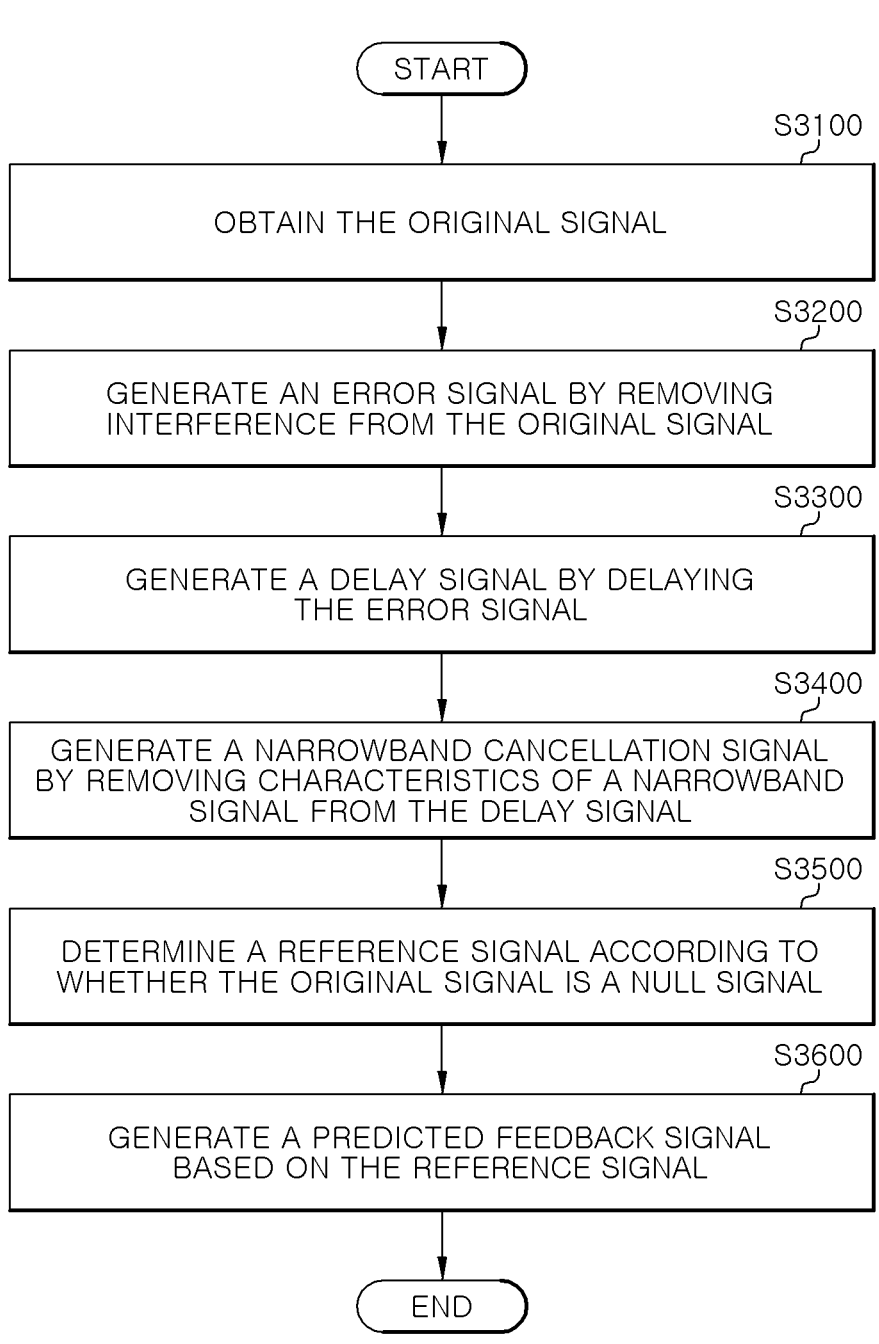
FIG. 3 is a flow diagram of a method for canceling interference for a 5G ICS repeater according to another embodiment of the present disclosure.

FIG. 3 is a flow diagram of a method for canceling interference for a 5G ICS repeater according to another embodiment of the present disclosure.

In what follows, it is assumed that the method is performed by the apparatus for canceling interference 1000 of the 5G ICS repeater shown in FIG. 1.

Since the S3100 to S3300 steps are essentially the same as the S2100 to S2300 steps of FIG. 2, descriptions thereof will be omitted.

In the S3400 step, the apparatus for canceling interference 1000 of the 5G ICS repeater may generate a first narrowband cancellation signal by removing characteristics of a narrowband signal from the first delay signal.

In the S3500 step, based on the magnitude information of the first error signal, the apparatus for canceling interference 1000 of the 5G ICS repeater may determine whether the first original signal is a null signal. Based on the determination result of whether the first original signal is a null signal, the apparatus for canceling interference 1000 of the 5G ICS repeater may determine either of the first error signal and the first delay signal as a first reference signal.

In one embodiment, the magnitude information may include the magnitude of the error signal.

In one embodiment, the apparatus for canceling interference 1000 of the 5G ICS repeater may obtain magnitude information of the error signal through envelope detection of the error signal or delay signal.

In one embodiment, if the magnitude of the error signal is less than a predetermined reference magnitude, the apparatus for canceling interference 1000 of the 5G ICS repeater may determine that the original signal is a null signal.

In one embodiment, if the magnitude of the error signal is greater than the predetermined reference magnitude, the apparatus for canceling interference 1000 of the 5G ICS repeater may determine that the original signal is a non-null signal.

In one embodiment, if the original signal is determined as a null signal, the apparatus for canceling interference 1000 of the 5G ICS repeater may select a delay signal as a reference signal.

In one embodiment, if the original signal is determined as a non-null signal, the apparatus for canceling interference 1000 of the 5G ICS repeater may select a narrowband cancellation signal as a reference signal.

Since the S3600 step is essentially the same as the S2700 step, specific descriptions thereof will be omitted.

Afterwards, the apparatus for canceling interference 1000 of the 5G ICS repeater may repeat the S3100 to S3600 steps, including generation of a second error signal by removing the second predicted feedback signal from a second original signal received after the first original signal.

Figure 4:
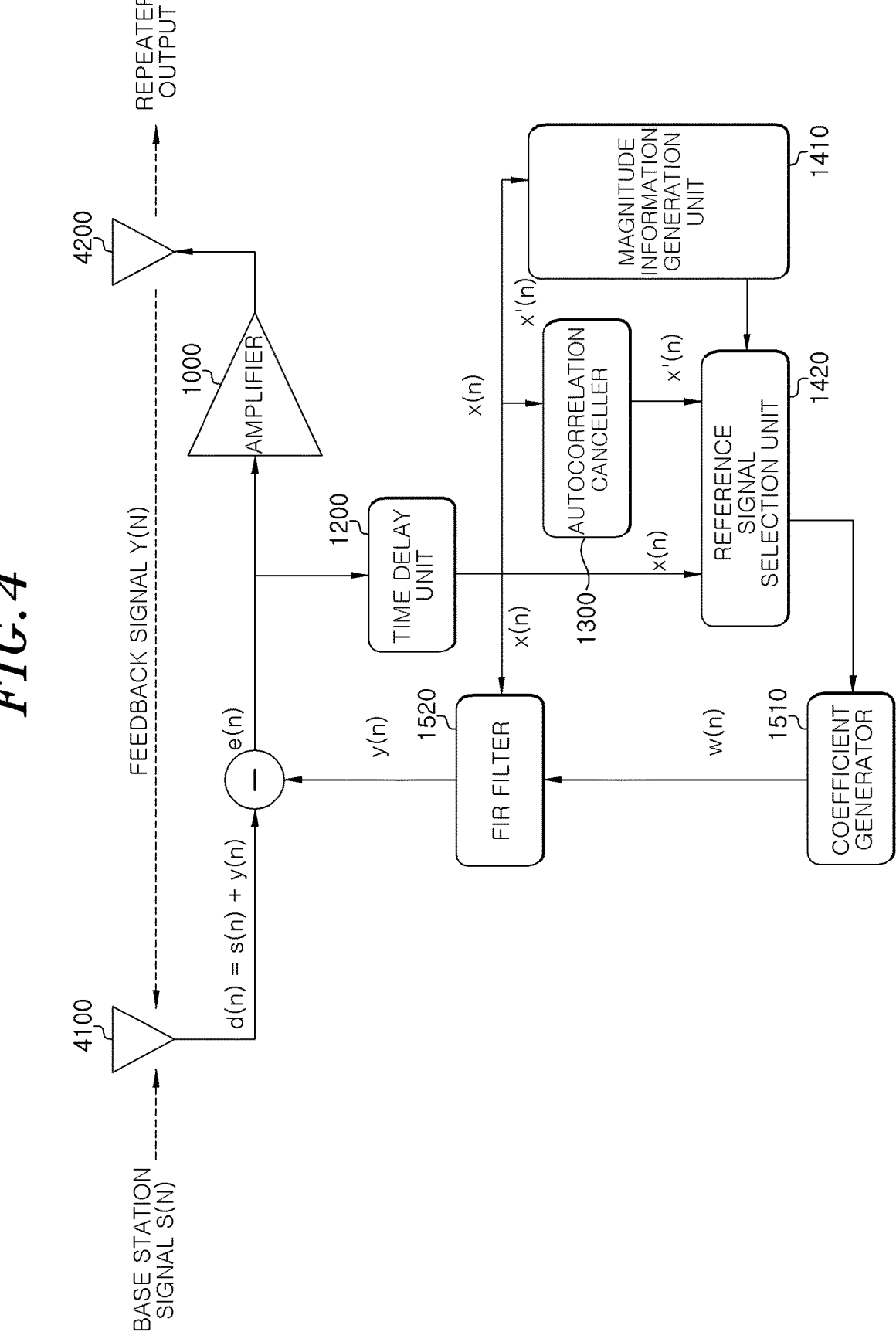
FIG. 4 illustrates an example of a 5G ICS repeater in which an apparatus for canceling interference for the 5G ICS repeater is applied according to one embodiment of the present disclosure.

FIG. 4 illustrates an example of a 5G ICS repeater in which an apparatus for canceling interference for the 5G ICS repeater is applied according to one embodiment of the present disclosure.

Referring to FIG. 4, the 5G ICS repeater may obtain a base station signal s(n) radiated from a base station and a first original signal d(n) including a feedback signal y(n) radiated from a transmission antenna 4200 using a reception antenna 4100.

The 5G ICS repeater may generate a first error signal e(n) by removing a first predicted feedback signal y(n) from the first original signal d(n).

The 5G ICS repeater may generate a first delay signal x(n) by delaying the first error signal e(n) by a predetermined amount of time.

The 5G ICS repeater may generate a first narrowband cancellation signal by removing characteristics of a narrowband signal included in the first delay signal x(n).

The 5G ICS repeater may determine whether the original signal is a null signal by performing envelope detection on the first delay signal x(n).

If the first original signal d(n) is determined as a null signal, the 5G ICS repeater may select the first delay signal x(n) as a first reference signal. Also, if the first original signal d(n) is determined as a non-null signal, the 5G ICS repeater may select the first narrowband cancellation signal as the first reference signal.

If the first reference signal is selected, the 5G ICS repeater may calculate a first interference signal prediction coefficient w(n) based on the correlation between the first error signal e(n) and the first delay signal x(n).

The 5G ICS repeater may generate a second predicted feedback signal by performing a convolution operation between the first delay signal x(n) and the first interference signal prediction coefficient w(n).

Again, the 5G ICS repeater may generate a second error signal obtained by removing the second predicted feedback signal from the second original signal.

At this time, the 5G ICS repeater may amplify the first error signal, the second error signal, and so on through the amplifier 1000 and radiate the amplified signals through the transmission antenna 4200.

Also, after generating the first narrowband cancellation signal, the 5G ICS repeater may determine whether to generate the first narrowband cancellation signal according to a determination result of whether the first original signal d(n) is a null signal instead of selecting either of the first delay signal x(n) and the first narrowband cancellation signal as the first reference signal according to a determination result of whether the first original signal d(n) is a null signal. Specifically, if the first original signal d(n) is determined as a null signal, the 5G ICS repeater may select the first delay signal x(n) as the first reference signal instead of generating the first narrowband cancellation signal; if the first original signal d(n) is determined as a non-null signal, the 5G ICS repeater may generate the first narrowband cancellation signal and select the generated first narrowband cancellation signal as the first reference signal.

The above description is merely an exemplary description of the technical scope of the present disclosure, and it will be understood by those skilled in the art that various changes and modifications may be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims, and it should be appreciated that all technical scopes included within a range equivalent thereto are included in the protection scope of the present disclosure.

DETAILED DESCRIPTION OF MAIN ELEMENTS

| | | | |
|---|---|---|---|
| 1000: | Apparatus for canceling interference of 5G ICS repeater | | |
| 1100: | Subtractor | 1200: | Time delay unit |
| 1300: | Autocorrelation canceller | 1400: | Reference signal determination unit |
| 1500: | Predicted feedback signal generation unit | | |

What is claimed is:

1. A method for canceling interference performed by a 5G ICS repeater, the method comprising:
    obtaining a first error signal by removing a first predicted feedback signal from a first original signal received through a reception antenna;
    generating a first delay signal by delaying the first error signal;
    determining whether the first original signal is a null signal based on magnitude information of the first error signal;
    determining a first reference signal based on the first delay signal according to a determination result of whether the first original signal is a null signal; and
    generating a second predicted feedback signal based on the first reference signal.

2. The method of claim 1, further comprising:
    generating a second error signal by removing the second predicted feedback signal from a second original signal received through the reception antenna.

3. The method of claim 1, wherein, if the first original signal is determined as a null signal, the determining of the first reference signal selects the first delay signal as the first reference signal.

4. The method of claim 1, wherein, if the first original signal is determined as a non-null signal, the determining of the first reference signal generates a first narrowband cancellation signal by removing characteristics of a narrowband signal from the first delay signal and selects the first narrowband cancellation signal as the first reference signal.

5. The method of claim 1, wherein the determining of whether the first original signal is a null signal includes:
    obtaining the magnitude information through envelope detection of the first error signal or the first delay signal; and
    determining the first original signal as a null signal if the magnitude information is less than a predetermined reference magnitude or determining the first original signal as a non-null signal if the magnitude information is greater than or equal to the predetermined reference magnitude.

6. The method of claim 5, wherein the predetermined reference magnitude is set based on a measurement result of the first original signal when a null signal is input to the 5G ICS repeater.

7. The method of claim 1, wherein the generating of the second predicted feedback signal includes:
    calculating a first interference signal prediction coefficient based on correlation between the first error signal and the first reference signal; and generating the second predicted feedback signal by performing a convolution operation between the first delay signal and the first interference signal prediction coefficient.

8. A method for canceling interference performed by a 5G ICS repeater, the method comprising:

obtaining a first error signal by removing a first predicted feedback signal from a first original signal received through a reception antenna;

generating a first delay signal by delaying the first error signal;

generating a first narrowband cancellation signal by removing characteristics of a narrowband signal from the first delay signal;

determining whether the first original signal is a null signal based on magnitude information of the first error signal;

determining either of the first delay signal and the first narrowband cancellation signal as a first reference signal according to a determination result of whether the first original signal is a null signal; and generating a second predicted feedback signal based on the first reference signal.

9. An apparatus for canceling interference for a 5G ICS repeater comprising:

a time delay unit generating a first delay signal by delaying a first error signal obtained by removing a first predicted feedback signal from a first original signal received through a reception antenna;

a reference signal determination unit determining whether the first original signal is a null signal based on magnitude information of the first error signal and determining a first reference signal based on the first delay signal according to a determination result of whether the first original signal is a null signal; and a predicted feedback signal generation unit generating a second predicted feedback signal based on the first reference signal.

10. The apparatus of claim 9, further comprising:

a subtractor generating a second error signal by removing the second predicted feedback signal from a second original signal received through the reception antenna.

11. The apparatus of claim 9, wherein, if the first original signal is determined as a null signal, the reference signal determination unit selects the first delay signal as the first reference signal.

12. The apparatus of claim 9, further comprising:

an autocorrelation canceller generating a first narrowband cancellation signal by removing characteristics of a narrowband signal from the first delay signal if the first original signal is determined as a non-null signal, wherein the reference signal determination unit includes a reference signal selection unit selecting the first narrowband cancellation signal as the first reference signal.

13. The apparatus of claim 9, wherein the reference signal determination unit includes:

a magnitude information generation unit obtaining the magnitude information through envelope detection of the first error signal or the first delay signal; and a reference signal selection unit determining the first original signal as a null signal if the magnitude information is less than a predetermined reference magnitude or determining the first original signal as a non-null signal if the magnitude information is greater than or equal to the predetermined reference magnitude.

14. The apparatus of claim 13, wherein the predetermined reference magnitude is set based on a measurement result of the first original signal when a null signal is input to the 5G ICS repeater.

15. The apparatus of claim 9, wherein the predicted feedback signal generation unit includes:

a coefficient generator calculating a first interference signal prediction coefficient based on correlation between the first error signal and the first reference signal; and an FIR filter generating the second predicted feedback signal by performing a convolution operation between the first delay signal and the first interference signal prediction coefficient.

16. An apparatus for canceling interference for a 5G ICS repeater comprising:

a time delay unit generating a first delay signal by delaying a first error signal obtained by removing a first predicted feedback signal from a first original signal received from a reception antenna;

an autocorrelation canceller generating a first narrowband cancellation signal by removing characteristics of a narrowband signal from the first delay signal;

a reference signal selection unit determining whether the first original signal is a null signal based on magnitude information of the first error signal and selecting either of the first delay signal and the first narrowband cancellation signal as a first reference signal based on a determination result of whether the first original signal is a null signal; and a predicted feedback signal generation unit generating a second predicted feedback signal based on the first reference signal.

* * * * *